Figure 9:
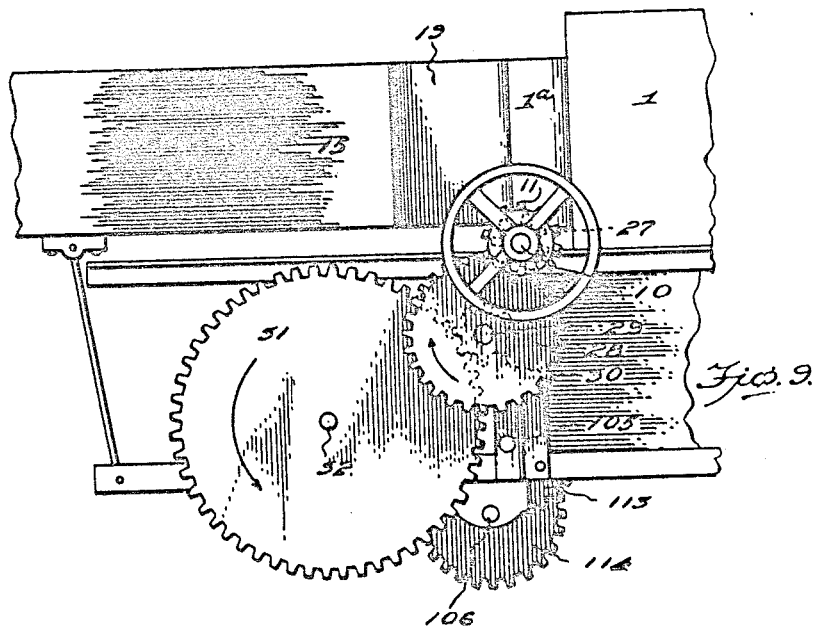

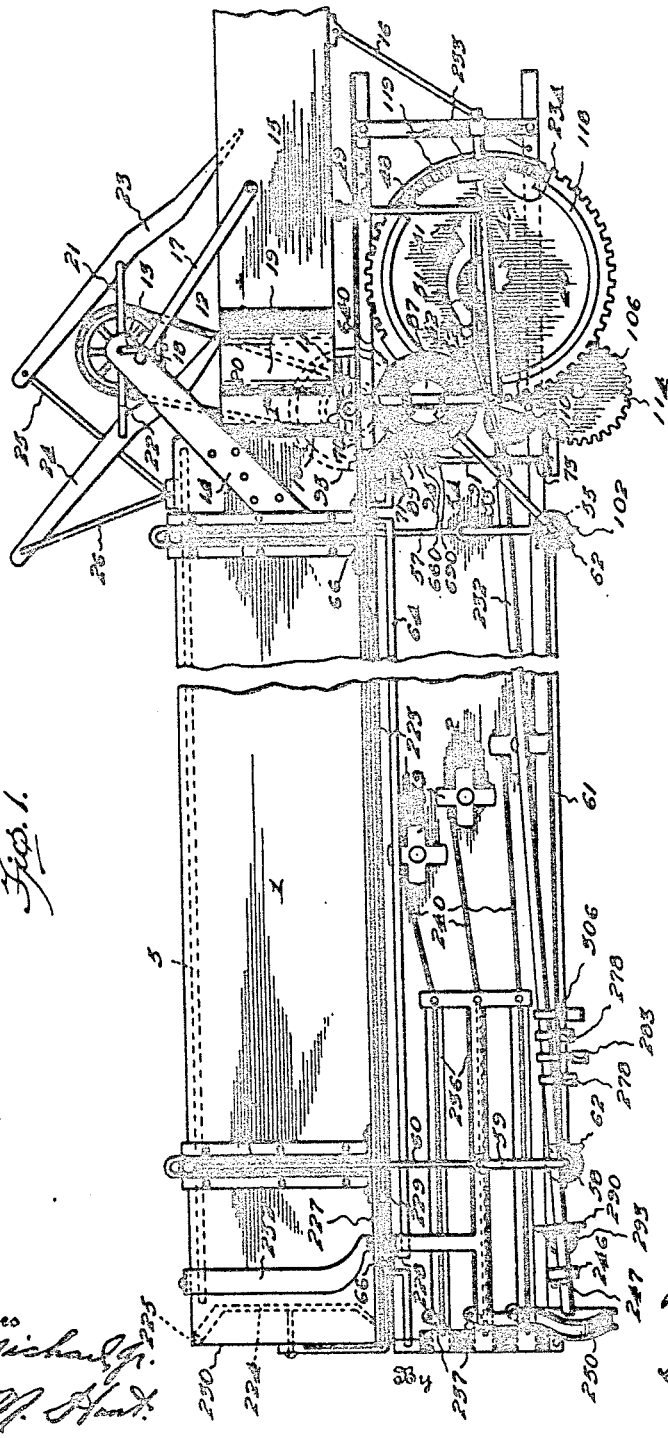

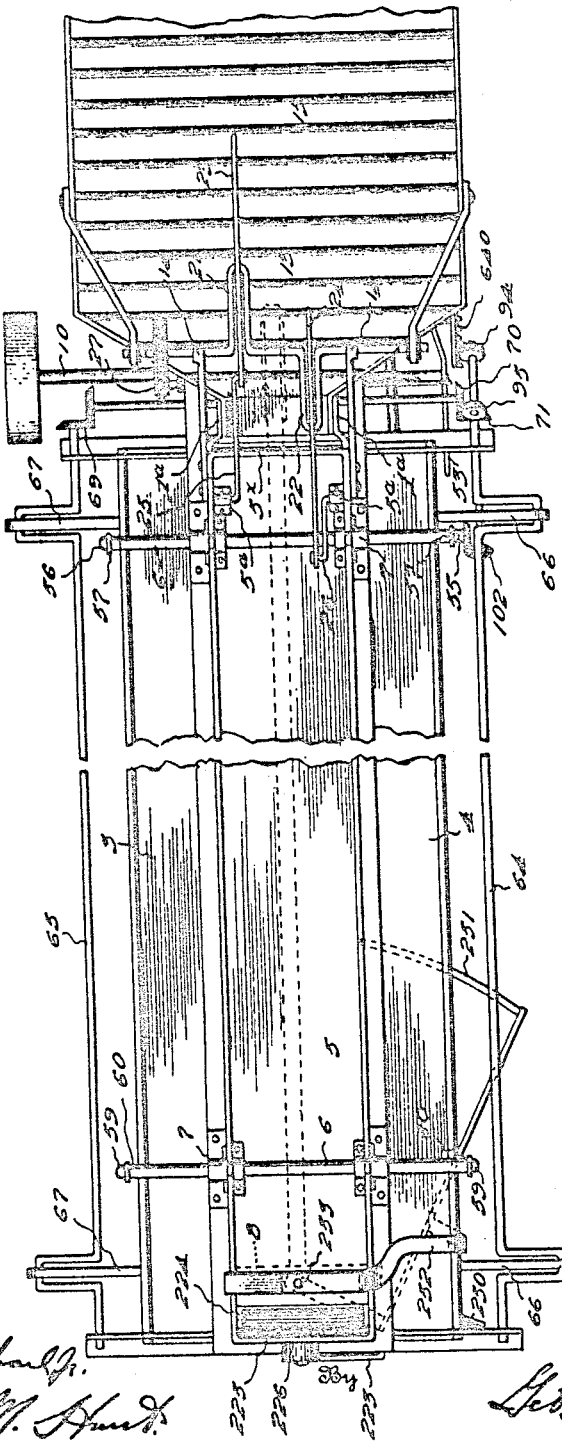

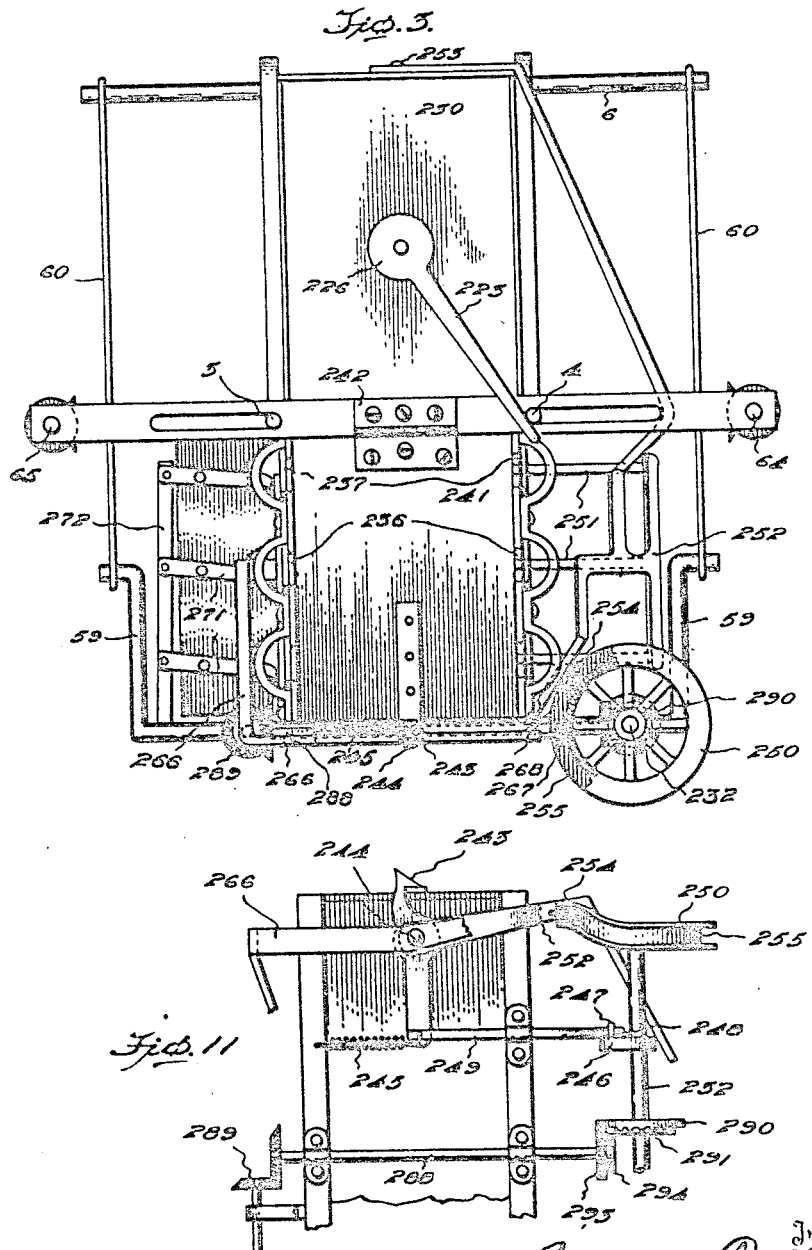

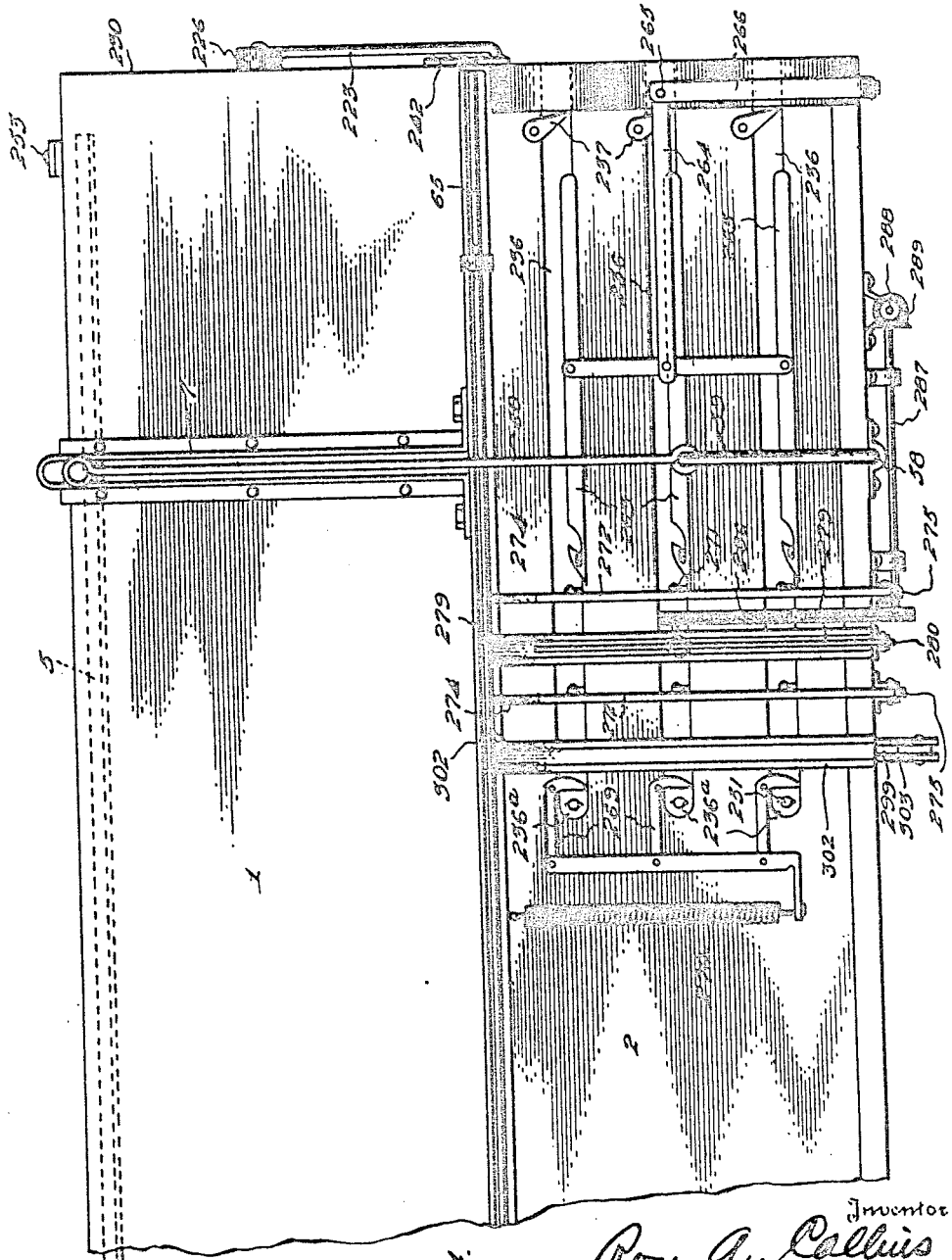

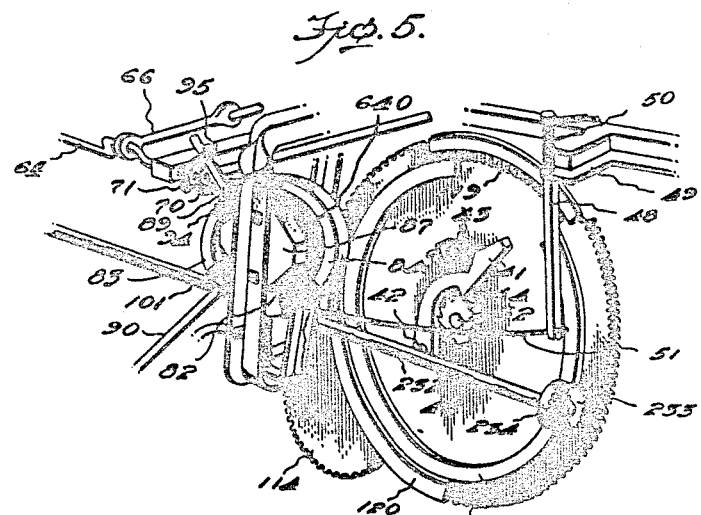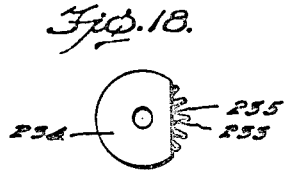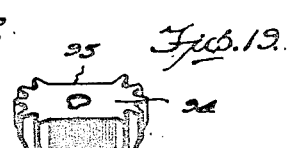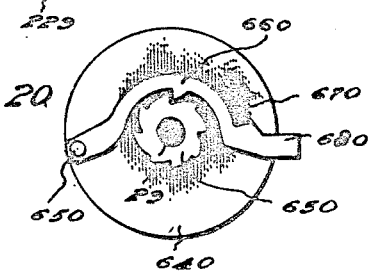

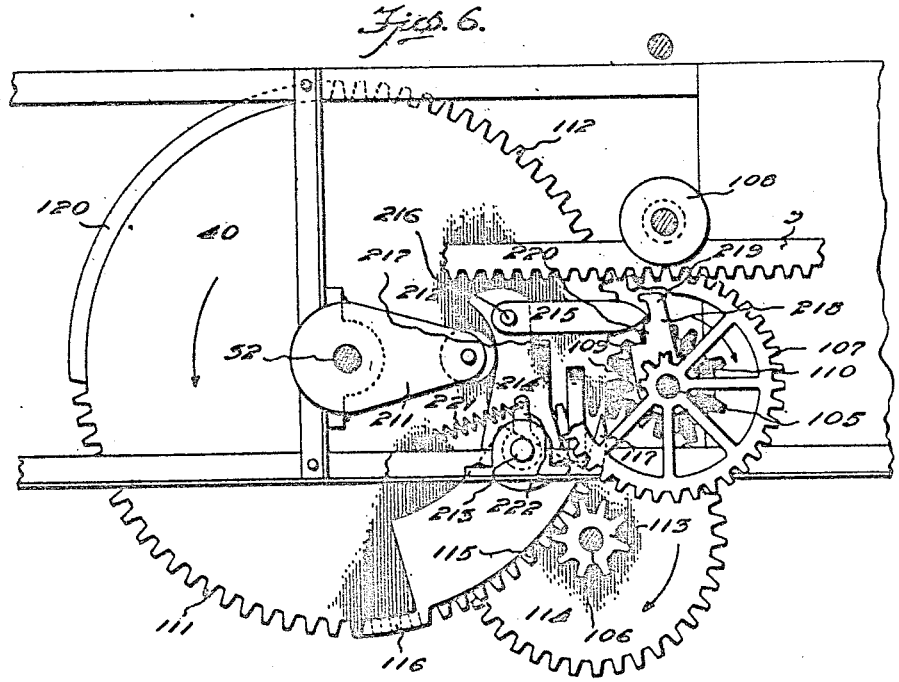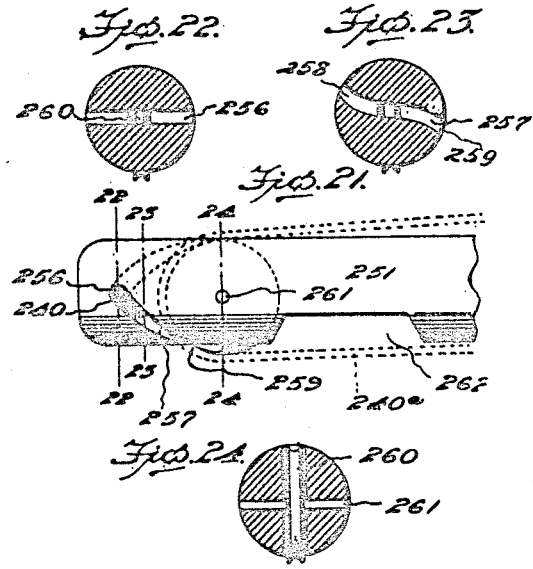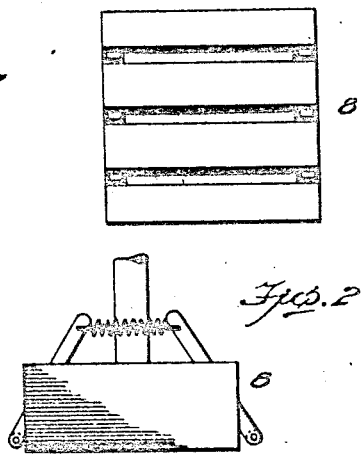

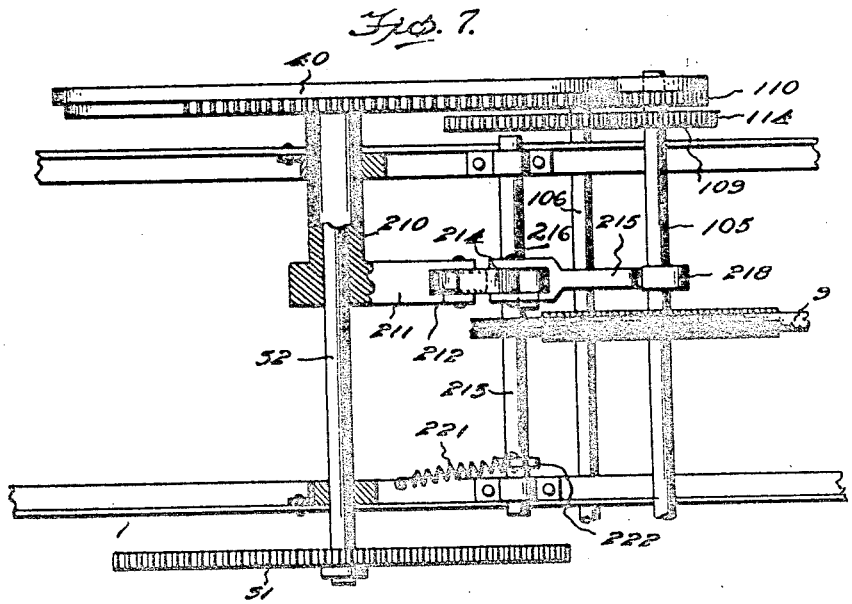
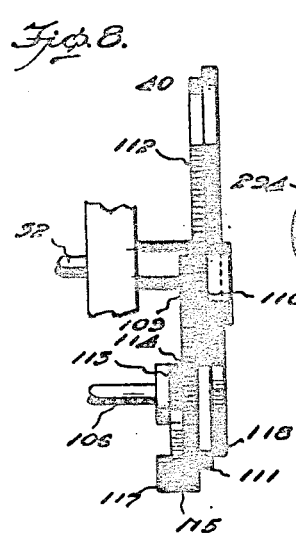
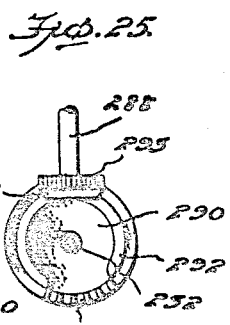
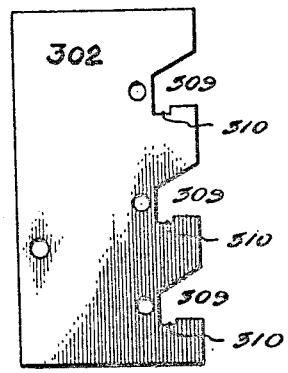

R. A. COLLINS.
AUTOMATIC BALING MACHINE.
APPLICATION FILED MAY 15, 1915.

1,170,141.

Patented Feb. 1, 1916.
9 SHEETS—SHEET 8.

Witnesses

Inventor
Roy A. Collins
By
his Attorney

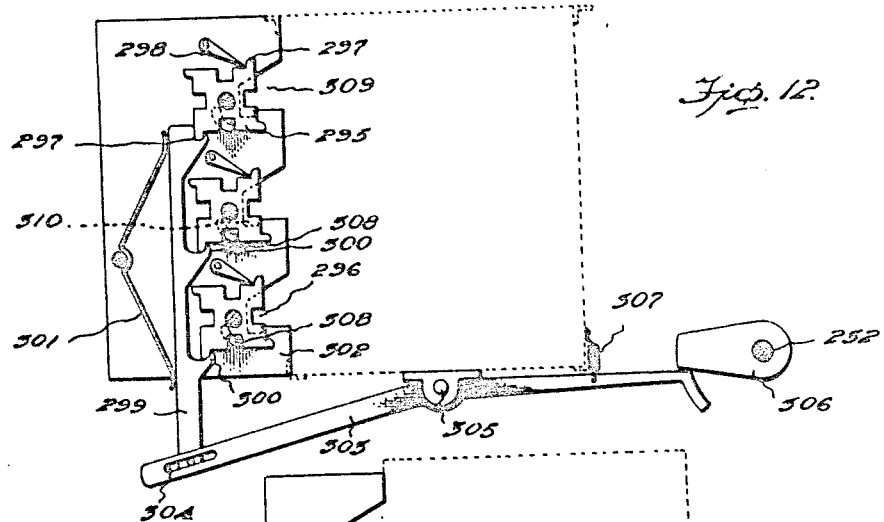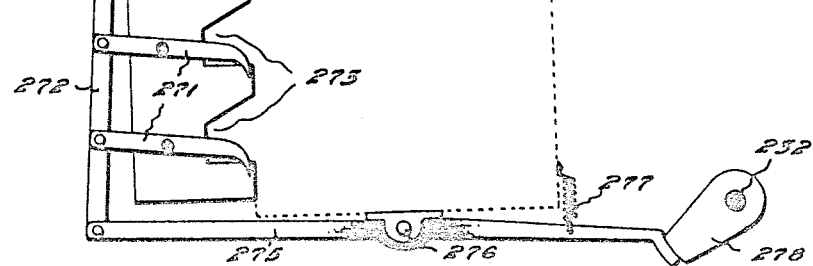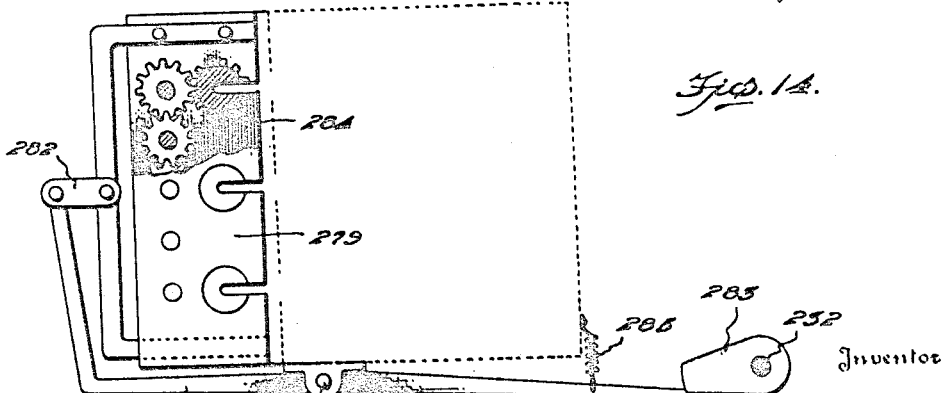

UNITED STATES PATENT OFFICE.

ROY A. COLLINS, OF GERSTER, MISSOURI.

AUTOMATIC BALING-MACHINE.

1,170,141.   Specification of Letters Patent.   Patented Feb. 1, 1916.

Application filed May 15, 1915. Serial No. 28,350.

*To all whom it may concern:*

Be it known that I, ROY A. COLLINS, a citizen of the United States, residing at Gerster, county of St. Clair, and State of Missouri, have invented certain new and useful Improvements in Automatic Baling-Machines, of which the following is a specification.

This invention relates to automatic baling machines and embodies improvements on the automatic baling machine set forth in my Patent No. 1,040,278, dated October 8, 1912.

The present improvements relate to the construction and operation of the feeder for deliverying the hay from the hopper or pan into the upper receiving chamber and to the control of the feeder by the vertically movable compressor, whereby the hay is prevented from packing and interfering with the downward movement of the compressor and when the compressor descends, the feeder is rendered inoperative until the compressor returns to normal position. The feeding operation by which the hay is taken from the pan or hopper and delivered to the receiving chamber is much more reliably carried on than with the feeding mechanism of my former patent.

Further improvements embodied in the present invention relate to means for locking the plunger while the bale is being wired and to effect a final compression of the bale; and also to start it out of the baling chamber after it has been wired. The improvements for this purpose impart a final advance to the rack, and hence the plunger, to effect a final compression of the bale before it is wired and they then mechanically lock the rack and plunger to hold the plunger stationary while the bale is being wired and afterward give an initial shove or movement to the rack to start the bale out of the compression chamber, after it has been wired.

My improvements for effecting the wiring of the bale, the clamping, twisting and severing of the wire, and the retention of the loose wire end from the reel embody novel operating mechanisms for the crosswise moving needles, for the looping or longitudinally moving needles, as also for the wire clamps, twisters and cutters by which I dispense with quite a number of mechanical movements and parts employed for the operation of these devices in the automatic baling machine of my Patent No. 1,040,278 and by which I simplify and render more precise and reliable the operation of these devices and control and operate them from a single shaft, and in certain instances, by a single cam on said shaft. An improvement in the wire holding part of the crosswise operating needles enables me to dispense with the mechanism employed in my patent for giving these crosswise operating needles a quarter turn and to bring about the proper positioning of the wire for looping by the longitudinally moving needles without resorting to any turning mechanism for the crosswise moving needles, resulting in greater reliability of operation in that connection.

The present improvements contemplate, further, changes in the construction of the wire cutters and holders; the means for opening and closing the horizontal gates that separate the receiving chamber from the compression chamber; the catch releasing mechanism for the gate at the end of the baling chamber; and the automatic means which is actuated by the pressure of the bale in the receiving chamber to start the operation of the mechanisms for the purpose of forcing the hay into the compression chamber.

Such improvements as have not been specifically hereinbefore referred to will more fully and at large appear from the detailed description of the embodiment of the improvements which I have selected as illustrating the invention and which appear in the accompanying drawings, in which—

Figure 10:
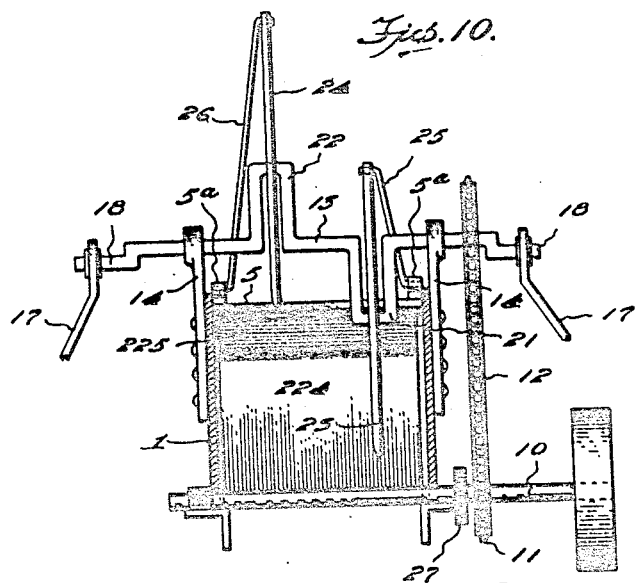

Figure 1 is a side elevation, the compressor being raised; Fig. 2, a plan view; Fig. 3, an elevation at the delivery end of the compression chamber, the cam being broken away; Fig. 4, an enlarged side elevation at the delivery end, showing the clamps, twisters, cutters and longitudinally moving needle; Fig. 5, a detail perspective of the master gear and the mechanisms that control the plunger, compressor, gates and bale wiring mechanism; Fig. 6, a detail elevation of the devices for operating the plunger and locking it; Fig. 7, a plan view thereof, certain parts being in section; Fig. 8, an edge view looking toward the left-hand edge of the gearing of Fig. 5; Fig. 9, a side elevation of certain gearing correlated to that of Fig. 6; Fig. 10, a rear elevation of the feeder, the receiving chamber being in section and certain parts broken away; Fig. 11, a bottom view of the baling chamber showing the latch and the mechanism for turning the twister wheel; Fig. 12, a detail view of the cutter and its operating mechanism; Fig. 13, a similar view of the wire clamps; Fig. 14, a like view showing the twister and the mechanism for bodily moving it toward and away from the side of the baling box or chamber; Fig. 15, a detail view of one of the plates of the cutter; Fig. 16, a detail of the master gear and certain latching mechanism; Fig. 17, a detail view of the false end for the receiving chamber and the spring-actuated shaft; Fig. 18, a detail of a certain pinion; Fig. 19, a detail of another mutilated gear; Fig. 20, a detail of the latching mechanism for the master gear; Fig. 21, a detail side elevation of the end of one of the crosswise operating needles, full lines at 240 showing the baling wire when the needle is retracted and dotted lines representing the position of the baling wire when the needle is projected across the rear end of the bale; Figs. 22, 23 and 24, detail sections on corresponding lines of Fig. 21; Fig. 25, a detail of the gearing which operates the twister wheels; Fig. 26, a face view of the plunger; and Fig. 27, a plan view thereof.

The machine will be suitably supported on a wheeled truck, by preference, so that it may be readily moved from place to place according to conditions of use, but it may be stationarily supported in any desired manner.

The baling box or chamber is composed of an upper receiving chamber 1 and a lower compression chamber 2 having the same side walls, closed at the compression end by a gate hereinafter described, open at the other end, and having an open top. The baling box is subdivided into the aforesaid chambers by the horizontally movable gates 3 and 4 which are adapted to slide through slots in the walls thereof, these gates being normally closed while the hay is being fed into the receiving chamber and being adapted to automatically separate or open to permit the hay to be condensed into the compression chamber below said gates at a certain time for subsequent compression by the plunger into a bale.

Condensing of the hay and its passing into the compression chamber is accomplished by a vertically movable top or compressor 5 carried by cross bars 6 sliding in vertical guides 7, the parts being so timed and related in their operation that this compressing top does not interfere with the horizontally movable gates. The plunger 8 is movable in the compression chamber and suitably fits it, being provided with a rack 9 which is operated at certain times as will more fully appear hereinafter.

Extending across the machine at the receiving end thereof is a drive shaft 10 which is provided with a suitable belt pulley or other means for its rotation from a suitable motor or engine. The shaft carries a sprocket wheel 11 which is connected by sprocket chain 12 to another sprocket on a crank shaft 13 which is mounted in brackets 14 secured to the sides of the receiving chamber 1. The pan or hopper 15 which originally receives the hay, is mounted on rockers 16 so that it can vibrate to and fro in relation to the receiving chamber. Such vibratory motion is effected by links 17 pivoted to the sides of the pan or hopper 15 and connected to cranks 18 at the ends of crank shaft 13. The hopper is corrugated from end to end, the corrugations running transversely, and its forward end is contracted at 19 and loosely entered at 20 between the extensions 1ᵃ of the receiving chamber 1. The extensions 1ᵃ are located beyond the end of the compressor 5 and the knife 5ˣ carried thereby so as to avoid interference therewith at any time.

The shaft 13 has oppositely set cranks 21, 22, which carry feeder arms or packers 23, 24 adapted to take into or engage the hay in the hopper or pan 15 and to feed it toward the receiving chamber 1 under the compressor 5. These packers are normally arranged to swing to and fro, as shown in Fig. 1, and to that end, their upper ends are connected by rods or links 25 and 26 to brackets 5ᵃ carried by the compressor 5. Consequently, when the compressor 5 is in its uppermost position, as shown in Figs. 1, 2, 10, as when the receiving chamber 1 is intended to receive hay from the pan or hopper 15, the arms or packers 23, 24 will feed the hay from the hopper or pan 15 into the receiving chamber and the throw of the cranks is such that this will be effected in a regular and rapid manner. Feeding is effected because the points of the packers are disposed downwardly in position to engage the hay. When the compressor 5 descends, however, as when the receiving chamber 1 has been suitably filled with hay and such hay is to be pushed into the compressing chamber by the compressor 5, for the subsequent formation of the bale, the descent of the compressor 5 pulls down the links 25, 26, thereby elevating the points or free ends of the packers 23, 24, so that they do not engage the hay and consequently all feeding ceases until the compressor 5 has ascended and resumed its normal position, as shown in Fig. 1.

The shaft 10 carries a pinion 27 which meshes with a gear 28 on a shaft 29. Immediately next the gear 28 is a pinion 30 which meshes with a gear 31 on a shaft 32. Loose on the end of the shaft 32 and opposite the gear 31 is an operating gear wheel 40 which is made fast to, or disengaged from, the shaft 32 according to the position of a latch 41 which is pivoted to the gear at 42 and is pressed by a spring 43 so that its normal tendency is for its tooth 44 to engage the toothed wheel 45 fast on the shaft 32. This latching or release of the wheel 40 is controlled by a trip 48 mounted to slide vertically in a bar 49 on the frame and suspended by spring 50. The latch is operated by a rod or lever 51 which is fulcrumed at 52 on the frame of the machine and has an end 53 positioned to be engaged by the crank 54 of shaft 55 which is journaled in the frame of the machine and extends thereunder; said shaft having a crank arm 56 on its opposite end, the cranks 54 and 56 being connected by rods 57 to the rear cross bar 6 that operates the compressor 5. There is a rear crank shaft 58 whose cranks 59 are connected to the compressor 5 by rods 60 secured to the other cross bar 6. A shaft 61 extending lengthwise under the machine is connected by gears 62 to the respective shafts 55 and 58, whereby on turning of the crank shaft 55, the compressor 5 will be operated, and during such operation the end 53 of the rod or lever 51 will be engaged by the crank 54, raising the trip 48 and releasing the latch 41 to permit it to be locked to the shaft 32, thereby causing the operating wheel 40 to turn the shaft 32 and bring about certain operations which will appear hereinafter.

The gates 3 and 4 are operated by crank shafts 64 and 65 whose cranks are connected thereto by connecting rods or pitmen 66 and 67. A cross shaft 68 is connected by gearing 69 with crank shaft 65 and by gears 70 and 71 with crank shaft 64, whereby the gates 3 and 4 are simultaneously opened or closed. The gear 71 is driven, to open and close the gates, as hereinafter set forth.

Referring to Figs. 1, 5, 6, 7, there are two shafts 105 and 106 extending crosswise of the machine at the receiving end and mounted in suitable bearings, the former of which has a pinion 107 meshing with the rack 9 which is connected to the plunger 8. The rack is held on the pinion 107 by a guide roller 108 which is carried by a suitable shaft journaled in the frame-work. The shaft 105 carries two gears 109 and 110, gear 110 being adapted to mesh with the gear segments 111 and 112 of the gear 40, at different times. The shaft 106 has two gears 113 and 114, the latter meshing with the gear 109 and the former being adapted to be turned by a gear segment 115 which is secured to the inner face of gear 40 in offset relation thereto and is provided with fingers 116 and 117 at its ends. The shafts 105 and 106 are driven solely from the gear 40 and through them the gear 107 is turned in one direction or the other and to a greater or lesser degree to accomplish the advance of the plunger in the compression chamber, the stoppage of the plunger while the bale is being wired or bound, the further advance of the plunger on the completion of the wiring or binding of the bale to eject the completed bale, and the return of the plunger to normal retracted position ready for compression of another bale.

On the outer face of the gear 40 there is provided a nearly complete circular blank raised track 118. Laterally offset therefrom is the gear segment 119 which is of a length substantially the same as the distance between the ends of the track 118, or, the distance of the break therein. The gear 40 has a relatively long gear segment 111 and, opposite on its periphery, a shorter gear segment 112, both of which are adapted to mesh, at different times, with the gear 110. The gear segment 115 begins, in slightly overlapped relation, where the gear segment 111 stops and ends at some distance from the terminus of the gear segment 112.

If it be assumed that the first tooth of those in the series 111 be starting to engage the pinion 110 the turning of the shaft 105 in the direction of the arrow, will cause a corresponding turning of the gear 107 and consequently the rack 9 will be run into the compression chamber, advancing the plunger and compressing the hay, but when the plunger has reached the position where the bale is suitably compressed and is ready to be bound or wired, the teeth 111 will become disengaged from the pinion 110. The smooth periphery 120 will then, on further turning of wheel 40 in the direction of the arrow, block any retrograde movement of the gear 110 and the wiring of the bale will be proceeded with as will presently appear. When the smooth portion 120 has passed the gear 110, the teeth 112 engage the gear 110 and still further advance the plunger which brings about the ejection of the completed bale from the baling chamber. On the disengagement of the teeth 112 from the gear 110, there is a slight pause in the movement of the plunger prior to its retraction.

The gear 40 is loosely mounted on shaft 32 by virtue of a sleeve 210 which carries said gear. Secured to the sleeve 210 is an arm 211 which preferably carries an anti-friction roller 212. Journaled in suitable bearings on the frame is a shaft 213 which carries a cam arm 214. A pressure member 215 is pivoted to the cam arm at 216 and is prevented from dropping by a shoulder 217 on the cam arm 214. The same shaft 105 which carries the gear 107 that operates the plunger of the rack 9, carries an arm 218 which has steps 219 and 220 adapted to be engaged by the pointed end of the pressure member 215. The shaft 213 is retracted by a spring 221 secured to the frame and to an arm 222, and consequently, the cam arm 214 is normally down and both it and the member 215 out of the path of the arm 218 when the rack is retreating, as the plunger is being retracted in the compression chamber. When the plunger 8 has been advanced by rotation of the gear 107 to compress the hay and form the bale for wiring, the arm 211, having previously engaged the cam arm 214, and the arm 218 being then in the position shown in Fig. 6, further rotation of the gear 40 causes a final pressure to be exerted by arm 211 through the cam arm 214 and the pressure member 215 against the steps of the arm 218, thus slightly turning the gear 107 and imparting a slight final inward movement to the rack 9 and a final compression to the bail just before it is wired by the wiring mechanism hereinafter described. The arm 211, remaining in engagement with the cam arm 214 while the bale is being wired, the bale is held solidly and against possibility of expansion while such wiring is going on. On completion of the wiring of the bale, further rotation of the gear 40 causes the roller 212 to engage the higher part of the cam arm 214 and, thereupon the point of the pressure member 215 drops against the step 220 and finally against the face of the arm 218 to impart a preliminary shove or push to the wired bale before the teeth 112 engage the gear 110 and carry on the final advance of the plunger and the ejection of the completed bale from the baling chamber. The continued rotation of the gear 40 causes disengagement of the arm 211 from the cam arm 214, whereupon the spring 221 retracts the cam arm 214 and the pressure member 215, which are then out of the way for the retraction of the rack 9 and plunger 8. The continued rotation of the gear 40 brings the teeth 115 into engagement with the pinion 113 which, through the gear 114, and pinion 109, causes a very rapid retraction of the plunger due to reversal of rotation of the shaft 105. During these compressing, baling and ejecting operations, the gates 3 and 4 have been closed and the hay has been continuously fed into the receiving chamber 1 by the packers 23 and 24 so that when the plunger 8 has been retracted, the teeth 111, after a brief period of rest, again engage the gear 110 and again force the plunger into the baling chamber to compress the hay, but this operation does not occur until the mechanisms hereinafter described have opened the gates 3 and 4 and drawn down the compressor 5 and said mechanisms have again resumed their normal positions.

The shaft 29 is provided with a clutch 630 of the same form as the clutch 45 previously described, and there is loose on said shaft 29 a master wheel 640 to which is pivoted at 650 a latch 660 pressed by a spring 670 and adapted to engage the clutching device 630 when the latch is released. The latch is, however, normally held free of engagement with the clutch 630 by engagement of the head 680 thereof with a laterally extending trip 690 on a longitudinally slidable rod 223 extending along the side of the baling box under the gates 3 and 4 thereof to the expulsion end of the baling box. The trip 690 is urged upwardly by a vertically movable rod 710 whose lower end is loosely seated at 72 in the frame, said rod being urged upwardly by a spring 73. The mounting of the rod 710 at 72 is such that the rod 710 can swing according to the movement imparted to the rod 223 so that the trip 690 can be withdrawn from the head 680 of the latch 660.

At the rear end of the compression chamber inside thereof, is a pressure member or false end 224 which is pivoted at its upper end 225 and against which the hay is fed into the receiving chamber above the gates 3 and 4 and below the compressor 5. The rod 223 is connected to the pressure member 224 at 226 and is spring-actuated by a spring 227 having an abutment on a guide 228 on the side of the baling chamber and also acting on an adjustable collar 229 carried by the rod 223. By adjusting the collar 229, the tension or pressure the false end 224 will stand before it yields under the pressure of the hay in the receiving chamber can be regulated as desired, and consequently, the pressure of the hay which will be withstood before tripping and releasing the master wheel 640, can be regulated. The stationary end 230 of the receiving chamber is provided with an opening 231 through which emerges the bent end of the rod 223.

When the pressure of the hay fed into the receiving chamber above the gates 3 and 4 and below the compressor 5 becomes such that the pressure member 224 yields, the rod or bar 223 is shifted longitudinally and moves the trip 690, thus releasing the head 680 of the latch 660, whereupon the spring 670 causes the said latch to snap into engagement with the continuously rotating clutch 630 on shaft 29 and consequently at that time, the master gear 640 is positively locked to the shaft 29 and turns with it, thereupon bringing about operations which will shortly appear.

Referring now to Figs. 1, 5, 16, 18, 19, 20, the master gear 640 is provided on its face opposite that carrying the latch 660 with gear segments 81 and 82 and with blank arc-shaped tracks 83 and 84 whose ends terminate where the ends of the gear segments 81 and 82 begin. The tracks 83 and 84 are in substantially the same plane as the gear segments 81 and 82, there being the omitted or cut-out parts 85 and 86 on the wheel 640 exteriorly of the segments 81 and 82 and between the ends of the tracks 83 and 84. Secured to the main frame is a bearing block 87 in which are separately journaled shafts 89 and 90. The shaft 89 has a mutilated gear 94 provided with blank parts 92 and 93 located opposite to each other and adapted to permit the passage of the tracks 83 and 84 during rotation of the master wheel 640 without resulting in turning the gear 94. The teeth of the gear 94 are adapted to be engaged by the gear segments 81 and 82 at certain times. The shaft 89 has a bevel gear 95 meshing with gear 71 on crank shaft 64. It is through the intermittent turning and arresting of the gear 94 that the gates 3 and 4 are opened and closed at proper times. The shaft 90 has a gear 102 meshing with a gear on shaft 55 and it also carries a mutilated gear 101 of the same construction and form as the gear 94, and like said gear, having its mutilated parts adapted to slide against the tracks 83 and 84 without turning the said gear 101 and only being turned when engaged by the gear segments 81 and 82. A leaf spring 103 has a head 104 which is adapted to ride on the periphery of the master wheel 640 or to snap into the spaces 85 and 86 and prevent idle turning of the master wheel 640. This spring serves as a check to hold the master wheel when the latch 660 is disengaged from the clutch 630, but upon clutching of the master wheel 640 to the shaft 29, the spring 103 is pressed outwardly by the shoulders at the ends of the tracks 83 and 84.

The gates 3 and 4 will remain in their closed position, covering the lower or compression chamber, until the pressure of the hay forced into the receiving chamber 1 by the packers 23 and 24 becomes such as to move the pressure member 224, whereupon the trip 690 is swung free from the latch 660 and thereupon the latch engages the clutch 630, thus locking the master wheel to the shaft 29 and the master wheel then turns. The rotation of the master wheel brings the gear segment 81 opposite pinion 94, whereupon the brief engagement of the said segment and pinion causes the gates 3 and 4 to open or separate, and thereafter the mutilated part of the gear 94 engages the track 84 which holds it stationary with the gates open. The turning of the master wheel 640 thereafter brings the gear segment into engagement with the pinion 101, whereupon the compressor 5 is moved downwardly to force the hay into the baling chamber, the plunger 8 then being in retracted position. The descent of the compressor 5 elevates the points of the packers 23 and 24 and while they still continue to operate, they are disengaged from the hay and the feed of the hay to the receiving chamber is cut off.

The knife 5ˣ severs the hay in the receiving chamber from that exterior thereto. A complete revolution of the master wheel 640 having ensued, the gates 3 and 4 having first opened, the compressor 5 has descended, the compressor has ascended and the gates have been closed. After these operations, the crank 54 strikes the end 53 of the trip lever 51, thereupon releasing the trip 48 from the latch 41 which then locks the operating wheel 40 and the shaft 32, whereupon the plunger 8 advances and compresses the hay into the bailing chamber; the final compression of the bale is effected by the parts 211, 214, 215 and 218; the compression devices are locked while the bale is being wired or bound and the wiring mechanism starts to operate, as will now appear.

The mechanisms for wiring the bale, clamping, twisting and severing the wiring of the bale from the wire of the reels and the unlatching of the gate at the delivery end of the baling chamber are all operated and controlled by a longitudinally extending shaft 232. This shaft carries at one end the gear or pinion 233 whose teeth are complete and adapted to be engaged by the teeth 119 on the wheel 40, such engagement occurring only when the plunger has been run into the baling chamber to compress and form the bale and during the inaction of the plunger actuating mechanism, for it will be observed that the gear segment 119 is placed between the gear segments 111 and 112 which are, respectively, for the purpose of running the plunger into the baling chamber to compress the bale and, for ejecting the bale. As shown in Fig. 18, the pinion 233 has an integral disk 234 provided with a flattened portion 235 which is adapted to bear on the track 118 and thus prevent any turning of the shaft 232 during the entire rotation of the gear 40 except when the pinion 233 is engaged by the gear segment 119. Consequently, the binding or wiring mechanism now to be described, is inoperative except when the pinion 233 is thus engaged.

The plunger 8 is of the construction set forth in my Patent No. 1,040,278, being provided with horizontal grooves in its face and with spring-actuated arms having pulleys to engage the baling wires. As in my patent, the sides of the baling box or chamber are provided with slots 236 at the rear ends of which are pivoted catches 237 which are adapted to catch the baling wire and hold it as the hay is being pressed down from the receiving chamber into the baling chamber and thus prevent any interference with the hay; and further, to catch the baling wires pressed forward by the plunger 8 when a previously wired bale is being ejected. Spools or reels 239 carrying the wires 240 employed in binding or wiring the bale, are suitably positioned. The catches 237 I dispose oppositely to those of my patent, as I have found that better results are obtained by this arrangement.

The delivery or ejection end of the baling chamber is closed by a gate 241 hinged at its upper part at 242 and held at its lower edge by a catch 243 which is pivoted at 244 and whose outer end is inclined so that the gate or door 241 will re-latch itself by gravity after the bale had been ejected. The latch 243 is actuated by a spring 245 which tends to keep the door 241 locked. The shaft 232 carries arm 246 having pin 247 which is adapted to engage, at the proper time, the end 248 of an unlatching bar 249 which is pivotally connected to the latch 243. This mechanism is so timed that it will operate just before the plunger 8 starts to eject the bale.

The crosswise operating needles and the longitudinally operating or looping needles are both controlled and operated from the same wabble cam 250 carried by shaft 232.

The crosswise operating needles 251 which are of the improved form shown in Figs. 1, 2, are of arc shape form and are carried by a swinging frame 252 which is pivoted at 253 to a part of the frame above the compressor 5 and at 244 below the baling chamber where the latch 243 is pivoted. The pivots for the latch 243 and frame 252 need not coincide. The needles 251 swing to and fro crosswise of the baling chamber according as the frame 252 is swung by the wabble cam 250, the frame 252 carrying a roller 254 which is received in the channel 255 of the cam 250.

The eye of each needle 251 is of the improved construction shown in Figs. 21-24. There is a laterally extending or transverse eye or opening 256 through which the wire 240 passes, in transverse relation thereto, when the needles are retracted. Leading to the eye 256 is a slot 257 whose plane is angularly arranged in relation to the length of the needle, said slot extending through the needle and opening out at diametrically opposite points 258, 259 of said needle which entrances or mouths are each at substantially ninety degrees distant from the transverse eye or opening 256. A pulley or sheave 260 is journaled within the needle 251 on an axis 261 which extends transversely of the needle as does the eye 256. One half of the periphery of the sheave 260 faces the slot 257. The needle is provided with a cut-out portion 262. Normally the wire 240 runs through the eye 256, but when the wabble cam 250 acts on the roller 245 to swing the needles 251 across the baling chamber in the grooves or channels of the plunger 8, the looping of the wire 240 which is thus carried across the baling chamber causes it to at once slip into the slot 257 and by the peculiar formation of said slot, the wire is directed to the pulley or sheave 260 so that the looped portions of the wire 240 lie at ninety degrees distant from their normal positions with the lower stretches of the loops bridging the cut-out portions 262 of the needles. The travel of the needles is such that when they emerge from the opposite side of the baling chamber, the portions 240ᵃ of the wires are in position to be engaged by the longitudinally movable or looping needles 263 which are of substantially the construction set forth in my Patent No. 1,040,278.

The looping needles 263 are operated by a bar 264 which is pivoted at 265 to the arm 266, in turn pivoted at 244 and on its other end carrying a roller 267 which is received in the channel 255 of cam 250. Normally, the roller 254 is located at the point 268 of the cam 250 and the roller 267 just below the point, and consequently the needles 251 and 263 are in retracted position. When the shaft 232 is turned, the roller 254 is moved into the true part of the cam 250, thus projecting the needles 251 across the bale box and they there dwell until the cam turns around so that the roller 267 is actuated by the point of the cam to move the needles 263 toward the door 241 so that they will catch the looped portion 240ᵃ of the wire. Clamping, twisting and cutting of the wires around the bale then follow and the loose ends of the wire from the reels are held while the wire bale is being ejected, as in my Patent No. 1,040,278, but these mechanisms are of improved construction and operated in a new manner over the disclosures of that patent. The cam 250 coöperates with the roller 267 to initially dispose the hooked ends of the needles 263 beyond the inner ends 236ᵃ of the slots 236 in position to engage the part 240ᵃ of the wire when it is subsequently projected through the ends 236ᵃ by the needles 251.

As in my former Patent No. 1,040,278, I employ catches 269 coupled to and actuated by a spring 270 and arranged adjacent the ends 236ᵃ of the slots 236 so as to be adapted to engage the wire brought across the baling box by the needles 251 to hold it when the needles 263 form the loop.

Referring to Figs. 3, 4, and 13, the wire clamps 271 that hold the wire while the twisters are forming the twists are connected by a bar 272 as in my patent and are simultaneously operated to hold the wire in the notches 273 in plate 274 by a lever 275 pivoted at 276 at the bottom of the bale box and retracted by a spring 277 which normally holds the clamps 271 in raised position. A cam 278 on the shaft 232 operates the clamps 271 at the proper time.

Referring to Figs. 4 and 14, the frame 279 which holds the rotary twisters is moved to and fro in relation to the bale box by a lever 280 pivoted to the bottom of the bale box at 281 and having an extension connected to the links 282. A cam 283 on shaft 232 is adapted to coöperate with the lever 280 at the proper time to move the twister frame 279 toward the side of the baling box to cause the wires to enter the twisting wheels 284 to bring about the twist in the wires which have been passed around the bale. The twisting wheels which effect the twisting are the same as set forth in my Patent No. 1,040,278 and are intergeared as in that patent. The twister frame is retracted from the side of the baling chamber by spring 285 before the needles 263 are moved to the ends 263ᵃ of the slots 236 so that they will be out of the path of said needles.

The twisting wheels 284 are rotated from their gears by chain and sprocket gearing 286 operated by a shaft 287 which is turned from a cross shaft 288 below the baling chamber by gears 289. The shaft 288 is periodically operated, at the proper time, from shaft 232. A disk wheel or mutilated gear 290, carried by shaft 232, has a gear segment 291 and a track 292. The shaft 288 carries a pinion 293 which is adapted to engage with gear segment 291 but at all other times of the rotation of shaft 232, the blank portion 294 of the pinion 293 rides on the track 292 to thereby keep the shaft 288 from idle turning. The pinion 293 and shaft 288 are turned one revolution by the wheel 290 and the action is timed to take effect when the twister is in position to twist the wires which have been passed around the bale.

Improvements on the cutting and holding mechanism are shown in Figs. 4, 11, 12, 15, 25. The rotary or armed cutters 295 are provided with notches 296 in their sides and with teeth 297, the latter being adapted to be engaged by pawls or catches 298 to prevent backward turning of the rotary cutters. The rotary cutters are turned, step by step, by a bar 299 which has teeth 300 adapted to engage the teeth 297 diametrically opposite from where other ones of these teeth are engaged by the catches or pawls 298. A spring 301 which is located between the plates 302 which carry the cutters, has its free ends bearing on the bar 299 and forcing it toward the cutters so that it is adapted to engage them. The bar 299 is periodically raised, to turn the cutters 295 one step, by a lever 303 having a pin-and-slot connection 304 with the bar 299 and pivoted beneath the bale box at 305. A cam 306 carried by the shaft 232 is set and timed to coöperate with the lever 303 at the proper time to actuate it and turn the cutters. The lever 303 is retracted, after it passes off of cam 306, by a spring 307.

A further improvement is the provision of slots or holes 308 in one of the plates 302 which are arranged so that the piece of waste wire can fall out and thus clogging of the cutters and operating mechanism is prevented. The slots 309 which receive the wire near the twisted portion are provided with offsets 310 where the wire is cut by the notched portion 296 of the cutter.

The feeding of the hay, its delivery into the compression chamber, and the formation and final compression of the bale have all been previously set forth. The bale having been formed, it is wired and the bale wires twisted and severed and the loose ends of the wire from the reels held in the same general manner set forth in my Patent No. 1,040,278 by the operation of the improved mechanisms hereinbefore described. The advance of the plunger 8 as it ejects the bale, carries forward the wire from the reels intermediate the ends thereof which are held, and the wire is engaged by the catches 237 as it is forced past them by the plunger. Consequently, when the plunger is retracted, the wires are in position so that they encompass the outer end and the sides of the bale and when the crosswise operating needles 251 operate the wire is carried across the rear end of the bale and is caught by the clamps 269, then looped by the needles 263, twisted and severed.

Having thus described my invention, what I claim as new and desire to secure by Letters Patent, is:—

1. In a baling machine, a feeder comprising packers, links pivotally connected to one end portion of said packers and serving as an anchoring means therefor, the other end portion of each of said packers being free to engage the material to be fed, and an operating crank shaft engaged with the packers intermediate their ends.

2. In a baling machine, a feeder comprising packers, means for operating said packers, shiftable anchoring means for the packers independent of said operating means, whereby their movement or throw by the operating means is controlled, said anchoring means being shiftable to different positions to dispose the packers in operative or inoperative position.

3. In a baling machine, a feeder comprising packers, means for operating the packers, links engaged with the packers and adapted to control their movement, and a shiftable anchorage for said links, whereby the packers may be disposed in operative or inoperative position.

4. In a baling machine, the combination with a chamber, of a movable compressor adapted to act upon the material in said chamber, a settable feeder adapted to deliver the material to the chamber, operating means for said feeder, and means independent of said operating means connecting the feeder to the compressor, whereby the movement of said compressor sets the feeder in feeding or non-feeding condition.

5. In a baling machine, the combination with a chamber, of a movable compressor operating therein, a feeder comprising packers and operating means therefor, said feeder being adapted to deliver material to said chamber, and links connecting the packers to the compressor, whereby the movement of the compressor disposes the operative portions of the packers in non-feeding position.

6. In a baling machine, the combination of compression and receiving chambers, a movable compressor operating in the receiving chamber adapted to force the material from the receiving chamber into the compression chamber, a baling plunger operable in the compression chamber, and a feeder whose feeding and non-feeding action is controlled by the compressor.

7. In a baling machine, the combination of compression and receiving chambers, a movable compressor operating in the receiving chamber adapted to force the material from the receiving chamber into the compression chamber, a baling plunger operable in the compression chamber, a feeder comprising packers adapted for delivering the material into the receiving chamber, and an operative connection between the packers and the compressor, whereby, on the movement of the compressor into the receiving chamber, the packers are disposed in non-feeding position.

8. In a baling machine, the combination of compression and receiving chambers, a movable compressor operating in the receiving chamber adapted to force the material from the receiving chamber into the compression chamber, a baling plunger operable in the compression chamber, a crank shaft, packers operated by said crank shaft having parts adapted to engage and feed the material to the receiving chamber, and links connecting the packers to the compressor, whereby, when the compressor moves into the receiving chamber, the feeding parts of the packers are shifted and disposed in non-feeding position.

9. In a baling machine, the combination with a compression baling chamber, of a plunger operable therein, operating means for said plunger adapted to advance the plunger to compress or form the bale, give a final short movement to the plunger to effect final compression of the bale and retain the plunger thereafter while the bale is being bound, again advance the plunger to eject the bale and finally to retract the plunger.

10. In a baling machine, the combination with a compression or baling chamber, of a plunger operable therein, operating means for effecting the requisite movements of the plunger comprising a rack, pinion meshing therewith, and means for rotating the pinion in one direction or the other, an arm rotatable with the pinion, and locking or blocking means adapted to coöperate with said arm to prevent retrograde movement of the plunger when the bale is under compression.

11. In a baling machine, the combination with a compression or baling chamber, of a plunger operable therein, operating means for effecting the requisite movements of the plunger comprising a rack, pinion meshing therewith, and means for rotating the pinion in one direction or the other, an arm rotatable with said pinion, a cam arm, a pressure member adapted to be interposed between the cam arm and the arm first-named, and an operating arm controlled by the means that turns the pinion and adapted to engage the cam arm to position and hold it and the pressure arm so that the pressure arm will block the pinion and prevent retrograde movement of the plunger when the bale is under compression.

12. In a baling machine, the combination with a compression or baling chamber, of a plunger operable therein, and operating and controlling means adapted to advance the plunger to compress or form the bale, impart a final compression movement to the plunger, and lock or block the plunger while the bale is being bound, comprising a rack and pinion, means for driving the pinion in one direction or the other, an arm rotatable with the pinion and provided with a plurality of steps, and a pressure member for engaging said steps which is in turn, subject to the control of the operating means.

13. In a baling machine, the combination with a compression or baling chamber, of a plunger operable therein, and operating and controlling means adapted to advance the plunger to compress or form the bale, impart a final compression movement to the plunger, and lock or block the plunger while the bale is being bound, comprising a rack and pinion, means for driving the pinion in one direction or the other, an arm rotatable with the pinion and provided with a plurality of steps, a spring retracted cam arm, a pressure member pivoted to and carried by the cam arm and adapted to engage the steps aforesaid, and a rotarily mounted arm driven by the operating means and adapted to engage, move, slightly advance, and block the cam arm and thereby, through the pressure member and stepped arm, control the plunger as aforesaid.

14. In a baling machine, the combination with a compression chamber, of a receiving chamber, said chambers being in communication, means for forcing the material from the receiving chamber into the compression chamber, a baling plunger operating in the compression chamber, means controlling the operation of the plunger, a hinged or pivoted member or false end for the receiving chamber, and a spring-actuated controlling rod connected to said pressure member or false end and adapted to control the operation of the plunger driving means aforesaid, the pressure of the material in the receiving chamber acting on said false end being normally sustained by the spring tension of the rod.

15. In a baling machine, the combination of compression and receiving chambers, a two-part gate adapted to close or open communication between said chambers, a compressor adapted to operate in the receiving chamber, a baling plunger adapted to operate in the compression chamber, crank shafts connected to the respective sections of the two-part gate, a cross shaft having gear connections with the crank shafts, whereby they are simultaneously and equally rotated, and means for rotating the crank shafts at predetermined times.

16. In a baling machine, the combination with a baling box or chamber, of needles adapted to operate crosswise thereof, needles coöperating therewith adapted to operate longitudinally of the baling box or chamber, an operating shaft, a cam thereon, and operative connections between said cam and the respective needles whereby they are all controlled and operated by said cam.

17. In a baling machine, the combination with a baling box or chamber, of needles adapted to operate crosswise thereof, needles coöperating therewith adapted to operate longitudinally of the baling box or chamber, an operating shaft, a wabble cam, a pivoted frame carrying the crosswise operating needles which is controlled and operated by the cam, and a pivoted frame carrying the longitudinally operating needles which is also controlled and operated by said cam.

18. In a baling machine, the combination with a baling box or chamber, of two sets of needles, one set being adapted to operate crosswise of the box or chamber and the other set longitudinally thereof, one set of needles having hooks or the like and the needles of the other set being provided with an eye or opening and a slot leading from said opening, said slot being angularly arranged in relation to the length of the needle and emerging through the sides thereof at points offset in relation to the eye or opening aforesaid, whereby the baling wires carried by the last-named needles will be automatically shifted into position for engagement by the hooked needles on the advance of said wire-carrying needles.

19. In a baling machine, the combination with a baling box or chamber, of two sets of needles, one set being adapted to operate longitudinally of the box or chamber and the other set crosswise thereof, one set of needles having hooks or the like and the needles of the other set being provided with an eye or opening and a slot leading from said opening, said slot being angularly arranged in relation to the length of the needle and emerging through the sides thereof at points offset in relation to the eye or opening aforesaid, and a sheave or pulley having a portion of its periphery exposed to the offset portion of the slot, whereby the baling wires carried by the last-named needles will be automatically shifted into engagement with the sheaves of said needles and positioned for engagement by the hooked needles on the advance of said wire-carrying needles.

20. In a baling machine, the combination of a baling wire clamping or holding device, a baling wire twisting device, a baling wire cutting device, an operating shaft, cams carried by the operating shaft, pivoted levers controlled by said cams, there being one lever for each of said devices, and a direct-operated intermittently acting means for driving the twister from the operating shaft.

21. In a baling machine, a baling wire cutting mechanism comprising a plate having wire receiving notches and openings adapted to discharge the waste wire, and cutters arranged to coöperate with said notches and openings.

22. In a baling machine, a baling wire cutting mechanism comprising a plate having wire receiving notches and openings adapted to discharge the waste wire, and cutters having wire receiving notches in their sides adapted to coöperate with the aforesaid notches and openings.

23. In a baling machine, the combination with a plurality of rotary wire cutters having teeth, of pawls adapted to engage the teeth to prevent backward turning of said cutters, and an actuating bar having teeth adapted to engage the teeth of the cutters.

24. In a baling machine, the combination with a baling box or chamber, of a self-closing door therefor hinged at its upper end, a spring-retracted pivoted latch for said door, a main operating shaft, a wiper arm carried thereby, and an unlatching bar connected to the latch and adapted for actuation by said wiper arm.

ROY A. COLLINS.

Copies of this patent may be obtained for five cents each, by addressing the "Commissioner of Patents, Washington, D. C."